(12) United States Patent
Hodder

(10) Patent No.: US 7,548,348 B2
(45) Date of Patent: Jun. 16, 2009

(54) METHOD AND APPARATUS FOR FORMING A PRINT DATA STREAM WITH EMBEDDED COMMANDS

(75) Inventor: Leonard B. Hodder, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 999 days.

(21) Appl. No.: 10/949,547

(22) Filed: Sep. 24, 2004

(65) Prior Publication Data
US 2006/0071962 A1    Apr. 6, 2006

(51) Int. Cl.
G06K 15/00 (2006.01)
H04N 1/40 (2006.01)
H04N 1/407 (2006.01)
G06T 5/00 (2006.01)

(52) U.S. Cl. ..................... 358/3.28; 358/3.27
(58) Field of Classification Search ................ 358/1.15, 358/296, 1.13, 1.14, 3.27, 3.28; 380/233; 717/136
See application file for complete search history.

(56) References Cited

U.S. PATENT DOCUMENTS

| | | | |
|---|---|---|---|
| 4,261,039 A * | 4/1981 | Baker et al. ................ 358/1.5 |
| 4,631,671 A | 12/1986 | Kawashita et al. | |
| 4,965,825 A * | 10/1990 | Harvey et al. ................ 380/233 |
| 5,694,222 A * | 12/1997 | Yamada ...................... 358/296 |
| 5,833,375 A | 11/1998 | Gauthier et al. | |
| 6,024,289 A | 2/2000 | Ackley | |
| 6,049,869 A | 4/2000 | Pickhardt et al. | |
| 6,400,287 B1 | 6/2002 | Ehrman | |
| 6,453,462 B1 | 9/2002 | Meade et al. | |
| 6,490,051 B1 | 12/2002 | Nguyen et al. | |
| 6,498,657 B1 | 12/2002 | Kuntz et al. | |
| 6,883,164 B2 * | 4/2005 | Zhang et al. ................. 717/136 |
| 2004/0003013 A1 | 1/2004 | Coulthard et al. | |

* cited by examiner

Primary Examiner—Douglas Q Tran

(57) ABSTRACT

In response to a print job, a character code stream is generated including printable character codes. Each of the character codes is of a first bit length. Command codes to be embedded into the character code stream are padded with an identifier. The command codes and the identifier are of a second bit length that is one-half of the size of the first bit length. The padded command codes are inserted into the character code stream thereby to form a print data stream. The print data stream is transmitted to a printer. The identifier allows the printer to detect and extract embedded command codes while maintaining synchronization thereby to enable character code extraction.

41 Claims, 3 Drawing Sheets

LOOKUP:
00 LENGTH = 0
01 LENGTH = 2
02 LENGTH = 3
03 LENGTH = 1
etc.

METHOD AND APPARATUS FOR FORMING A PRINT DATA STREAM WITH EMBEDDED COMMANDS

FIELD OF THE INVENTION

The present invention relates generally to printing devices and in particular, to a method of forming a print data stream with embedded commands.

BACKGROUND OF THE INVENTION

Stand-alone electronic cash registers including payment card readers and receipt printers have been used for years in stores, retail outlets and service outlets to facilitate the completion of cash, cheque, credit card or debit card transactions for the purchase of goods and/or services. With the advent of sophisticated and inexpensive computing equipment, input devices and secure communication networks, point-of-sale (POS) stations have become an increasingly popular alternative.

POS stations typically include a host device and a plurality of interchangeable peripherals connected to the host device. The host device and peripherals are easily integrated allowing the configuration of POS stations to be modified to meet changing needs. This has been another factor leading to their widespread acceptance. The host device is commonly in the form of a personal computer. The peripherals often include a keyboard, a display screen, a cash drawer, a printing device, a payment card reader and a barcode reader. In some cases, a touch-sensitive display screen is used instead of separate keyboard and display screen peripherals.

As is well known, the host device communicates with the peripherals and executes software to allow product and/or service transactions to be completed. When payment is effected using a debit or credit card, the host device establishes a connection to the appropriate financial institution over an information network so that approval for the transaction may be obtained. Upon completion of any transaction, the host device creates and transmits a print job to the printing device causing the printing device to generate a transaction receipt and a possibly signing receipt, if payment is made using a credit card.

During creation of the print job, the host device creates a string of the character codes representing the characters to be printed and transmits the string to the printing device in a data stream. Depending on the nature of the characters to be printed, each character code in the data stream may be represented by a single data byte if standard (i.e. Latin) characters are to be printed, or as a data byte pair if larger and/or complex (i.e. multilingual) characters are to be printed. The host device also sends not-printable command codes to the printing device in a command stream to control the printer operation. Each command code in the command string is represented by a single data byte.

To improve efficiency, when transmitting data from the host device to the printing device, it is desired to transmit all data in a single stream. If different parts of the data stream have different bit lengths as is the case with double-byte character codes and single-byte command codes, synchronization errors arise if the command codes are simply embedded in the stream, making decoding of the stream impossible.

Techniques to combine characters of different bit lengths into a common data stream have been considered. For example, U.S. Pat. No. 6,400,287 to Ehrman discloses a data structure for converting mixed character sets comprising both single byte and double byte character sets into Unicode data. When a shift-out character code is encountered, the bytes subsequent to the shift-out character are interpreted as double-byte pairs. At the end of the double-byte string, a shift-in character is inserted to indicate that the following eight-bit bytes are to be interpreted as single-byte characters.

U.S. Pat. No. 6,490,051 to Nyguen et al. discloses a printer driver and method for supporting a world-wide single bindery font format, with built in support for double-byte characters. The printer driver compares the printer characterization, including the font resident in the printer, with a Unicode character to be printed in order to print the character using the printer resident font. The amount of data transferred to the printer is reduced by using the resident font stored within the printer to the extent possible. Single-byte characters are distinguished from double-byte characters using an identifier.

U.S. Pat. No. 6,024,289 to Ackley discloses a method and apparatus for encoding and decoding single-byte characters in double-byte character sets of machine readable symbologies. Single-byte characters are removed from a string of double and single-byte characters output by a system operating in a double-byte character mode. The single-byte characters are processed in a separate manner from the remaining double-byte characters.

U.S. Pat. No. 6,498,657 to Kuntz et al. discloses a system for enabling a printer to analyze incoming metadata, which may include formatting data foreign to the printer, and to translate the data into a format usable by the printer. An incoming data analyzer, a data extractor and a report generator all process incoming metadata command templates and, upon receipt of print data and metadata for a print job, translate the data according to the templates into a format suitable for the printer. A convert double-bytes to bytes program receives incoming data encoded in double-bytes and converts the double-byte printable characters into single-byte characters of not-printable commands and printable characters.

U.S. Patent Application Publication No. 2004/0003013 to Coulthard et al. discloses a system for transferring data and storing metadata across a network that provides compatibility between hierarchical and non-hierarchical file systems. Single-byte, double-byte, mutli-byte and Unicode character sets can be converted by first identifying the encoding scheme utilized.

Although the above references disclose methods of combining different length characters in a single data stream, improvements in the processing of print jobs including character and command codes are desired. It is therefore an object of the present invention to provide a novel method of forming a print data stream with embedded commands.

SUMMARY OF THE INVENTION

Accordingly, in one aspect of the present invention there is provided a method of forming a print data stream including both character codes and command codes. The character codes have a bit length that is a multiple of the bit length of the command codes. During the method, command codes to be embedded in a character code stream are padded with an identifier sized to make the padded command codes generally of the same length as the character codes. The padded command codes are inserted into the character code stream thereby to form the print data stream. The identifier allows embedded command codes to be detected and extracted from the print data stream while maintaining synchronization of the print data stream during character code extraction.

In one embodiment, each character code is double the size of a command code. Each character code is represented by a data byte pair and each command code is represented by a single-byte, with each command code being padded with a single-byte identifier. The identifier is a null data byte.

According to another aspect of the present invention there is provided a printing method. During the method, in response to a print job, a character code stream is generated including printable character codes. Each of the character codes is of a first bit length. Command codes to be embedded into the character code stream are padded with an identifier. The command codes and identifier are of a second bit length that is one-half of the first bit length. The padded command codes are inserted into the character code stream thereby to form a print data stream. The print data stream is transmitted to the printer. The identifier allows the printer to detect and extract embedded command codes while maintaining synchronization thereby to enable character code extraction.

In one embodiment, each character code includes a data byte pair and each command code is a single-byte. The identifier may be in the form of a null data byte. Each command code may be padded with a most significant null data byte or with a least significant null data byte.

Following transmission of the print data stream, the transmitted print data stream is parsed into data byte pairs. Each data byte pair is examined to detect each data byte pair including an identifier. For each data byte pair that includes an identifier, the command code is extracted and executed.

In another embodiment, the command codes form part of a command code string including a double-byte command code string header padding the command codes. The identifier forms part of the command code string header. The command code string header further comprises a data byte identifying the number of commands in the command code string.

Following transmission of the print data stream, the print data stream is parsed into data byte pairs. Each data byte pair is examined to detect each data byte pair including an identifier. For each data byte pair including an identifier, the data byte of the command code string header is examined to determine the number of single-byte commands in the command code string. Each of the single-byte commands is then extracted.

The present method of combining command bytes and data bytes in a single print data stream provides advantages in that during creation of a print job, all data including both character codes and command codes can be combined in a single print data stream even in situations where the character codes and command codes are of different bit lengths while still allowing the printing device to maintain synchronization and extract both the character codes and command codes from the print data stream.

BRIEF DESCRIPTION OF THE DRAWINGS

Embodiments will now be described more fully with reference to the accompanying drawings in which.

DETAILED DESCRIPTION OF THE EMBODIMENTS

Figure 1:
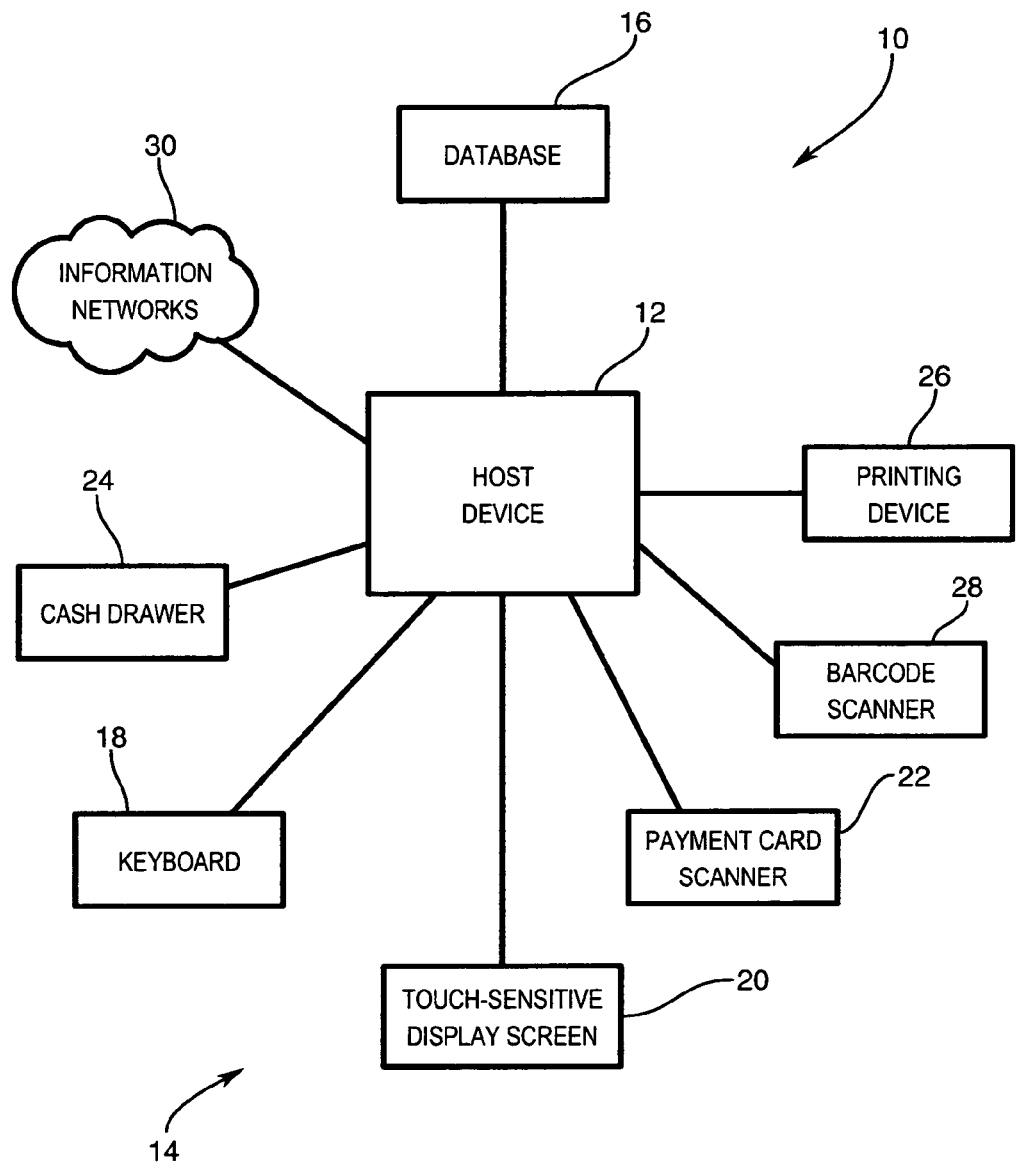
FIG. 1 is a schematic block diagram of a point-of-sale station including a printing device.

Turning now to FIG. 1, a point-of-sale (POS) station is shown and is generally identified by reference numeral 10. As can be seen, POS station 10 includes a microprocessor-based host device 12 in the form of a personal computer that communicates with a plurality of peripherals generally identified by reference numeral 14 and with a database 16 storing transaction, inventory, pricing, tax and accounting information. In this example, peripherals 14 include a keyboard 18, a touch-sensitive display screen 20, a payment card scanner 22, a cash drawer 24, a printing device 26 and a barcode scanner 28. Host device 12 also communicates with financial institutions (not shown) such as banks and credit card companies over one or more information networks generally identified by reference numeral 30.

Figure 2:
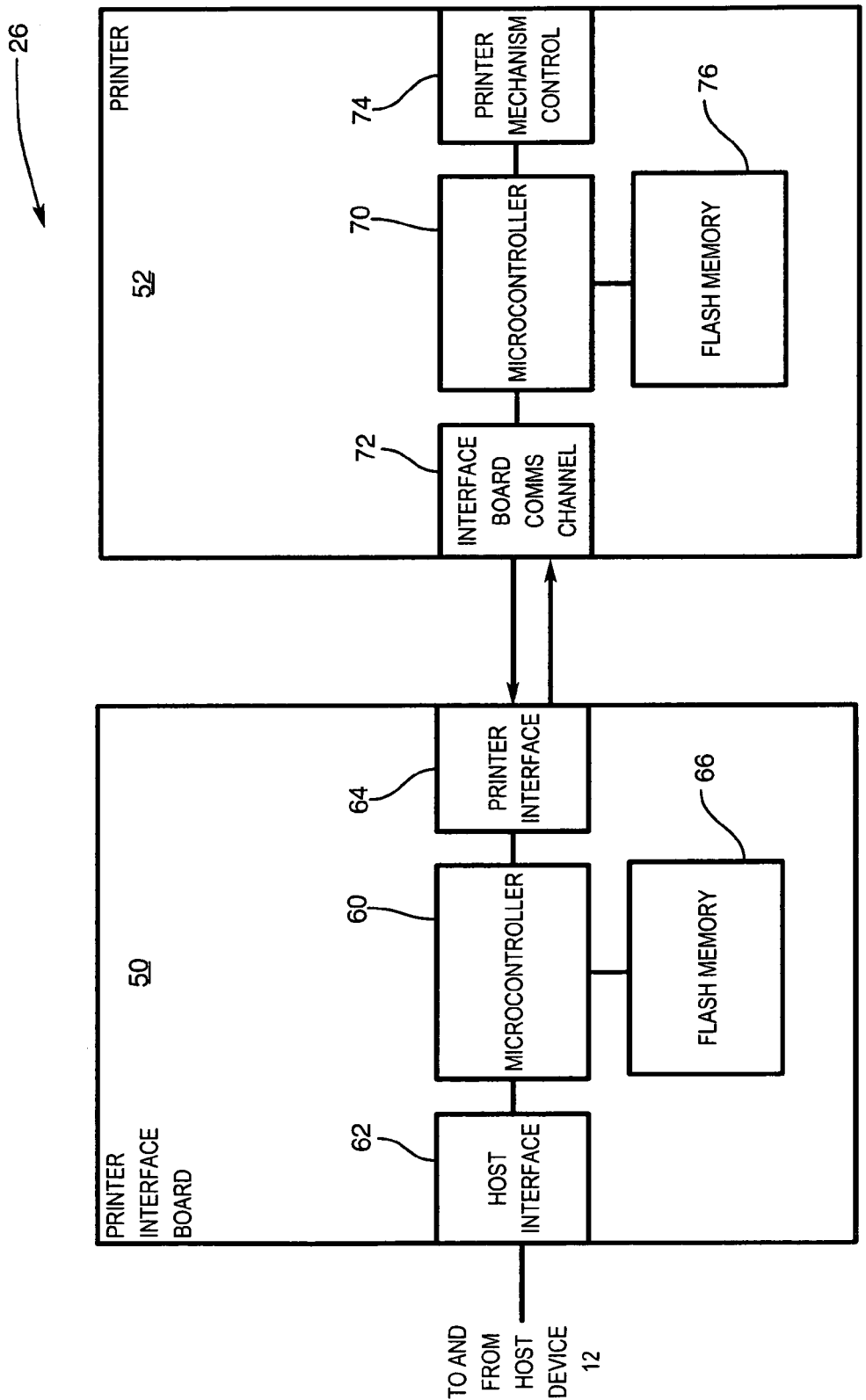
FIG. 2 is a schematic block diagram of the printing device of FIG. 1.

Printing device 26 is best illustrated in FIG. 2 and includes a printer interface 50 and a printer 52. Printer interface 50 comprises a microcontroller 60, a host interface board 62, a printer interface board 64 and non-volatile flash memory 66. Printer 52 comprises a microcontroller 70, a communications channel interface board 72, a printer control mechanism 74 and non-volatile flash memory 76. For example, the printer interface 50 may be of the type sold by EPSON under model No. UB-EML and the printer 52 may be of the type sold by EPSON under model No. TM-U200.

The non-volatile memory 66 stores printer interface firmware that is executed by the microcontroller 60 during initialization and operation of the printing device 26 to permit communications between the host device 12 and the printer 52 and optionally, to enhance operation of the printer by storing supplemental font files that allow the printer to print characters of different style and/or size and/or emulation files that allow the printer to emulate one or more other printer models.

The non-volatile memory 76 stores printer firmware that is executed by the microcontroller 70 during initialization and operation of the printing device 26 to allow the printer 52 to respond to commands generated by the host device 12 and print appropriate receipts when a transaction is completed. In this particular embodiment, the printer firmware includes a boot file, a main firmware file and a font file. The firmware also includes printer hardware and firmware identification information to enable the printer interface 50 to determine the type of printer 52 and the status of the resident printer firmware. For example, the printer hardware and firmware identification information includes the version string of the main firmware file, the version string of the boot file, the version of the font file and the printer model identification number (ID). The printer model ID is a single data byte, the value of which is unique to the printer.

Upon completion of a transaction, the host device 12 creates a print job and transmits the print job as a single print data stream to the printing device 26. The print data stream is received by the printer interface 50, which parses the print data stream into words and passes the words along to the printer 52 for processing.

The print data stream includes character codes and embedded command codes. Each character code in the present embodiment is a 16-bit multilingual (ML) character represented by a data byte pair. The set of multilingual characters may contain many thousands of characters including Chinese, Korean and/or Japanese characters, as well as the full Latin character set (letters A through Z, numbers 0 through 9, punctuation, special characters etc.). The first data byte of the pair holds the eight (8) most significant bits of the ML character and the second data byte of the pair holds the eight (8) least significant bits of the ML character. The embedded command codes are 8-bits in length. As mentioned above, simply embedding 8-bit command codes into the print data stream including the double-byte ML character codes will disrupt synchronization and inhibit the printing device 26 from being able to properly decipher the character and command codes in the print data stream.

Figure 3A:
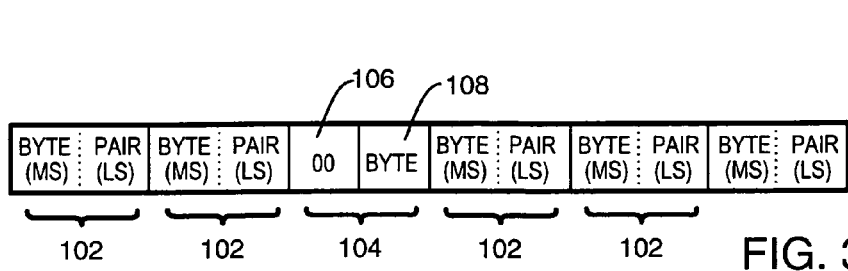
FIG. 3a shows a big-endian print data stream comprising a plurality of double-byte character codes and a single embedded padded command code.
Figure 3B:
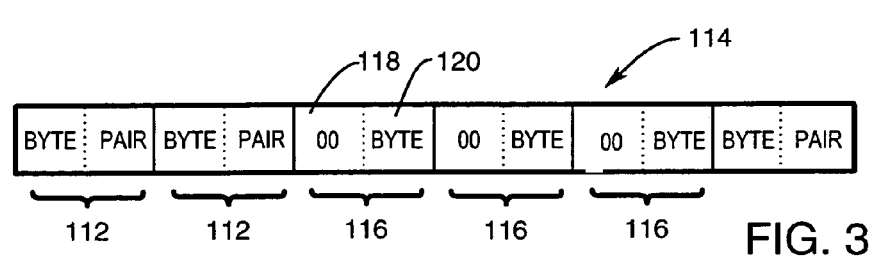
FIG. 3b shows a big-endian print data stream comprising a plurality of double-byte character codes and an embedded command code string including padded commands.

To maintain synchronization, in this embodiment the host device 12 pads each command code to be embedded into the print data stream, with a leading identifier in the form of a null data byte, making the command code effectively 16-bits (i.e. two data bytes) in length. The padded command codes are then inserted into the print data stream at appropriate locations and the print data stream is transmitted to the printing device 26. FIGS. 3a and 3b illustrate big-endian print data streams with embedded commands. As can be seen in FIG. 3a, the print data stream 100 includes a plurality of multilingual character codes 102 and a single embedded padded command code 104 comprising a leading null data byte 106 and a single-byte command 108. FIG. 3b shows a big-endian print data stream 110 including a plurality of multilingual character codes 112 and a command code string 114. The command code string 114 includes a series of command codes 116 each comprising a leading null data byte 118 and a single-byte command 120.

When the printing device 26 receives the print data stream, the data stream is parsed into data byte pairs (words) by the microcontroller 60 of the printer interface 50. The microcontroller 60 then examines the first data byte of each data byte pair to determine if the data byte is a null byte. For each data byte pair, if the first data byte of the data byte pair is not a null data byte, the microcontroller 60 recognizes that the data byte pair represents a ML character. The ML character data byte pair is then passed to the printer 52. Upon receipt, the microcontroller 70 of the printer 52 uses the data in the data byte pair to extract the appropriate glyph data from the font file so that the proper character is printed.

If the first data byte of a data byte pair is however a null data byte, the microcontroller 60 recognizes that the second data byte of the data byte pair represents a not-printable command code. In this case, the microcontroller 60 discards the null data byte and forwards the single-byte command code to the printer 52. Upon receipt, the microcontroller 70 processes the command code.

As will be appreciated, by padding command codes with null bytes, a single print data stream including both double-byte character and single-byte command codes can be sent to the printing device 26 to complete a print job. The manner by which the single-byte command codes are padded prior to embedding in the print data stream allows the embedded padded command codes to be detected, and the single-byte command codes extracted and executed while maintaining print data stream synchronization.

Figure 4:
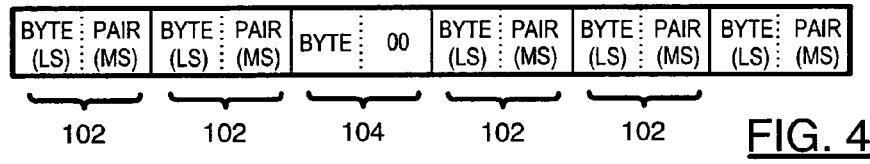
FIG. 4 shows a little-endian print data stream comprising a plurality of double-byte character codes and a single embedded command code.

Although the print data stream is described as including double-byte character codes in big-endian format i.e. with the first data byte of the data byte pair holding the eight (8) most significant bits of the ML character and the second data byte of the pair holding the eight (8) least significant bits of the ML character, it will be appreciated that the print data stream can alternatively include double-byte character codes in little endian format as shown in FIG. 4. In this case, when the host device 12 pads each command code to be embedded into the print data stream, the command code is padded with a trailing identifier in the form of a null data byte, making the command code effectively 16-bits (i.e. two data bytes) in length. After the printing device 26 parses the print data stream into data byte pairs, the second data byte of each pair is examined to detect the presence of a null byte and hence, a command code.

Although padding command codes in this manner is effective, if one or more large command code strings is/are to be embedded in the print data stream, padding each command in the command code string with a null byte and embedding the padded command code string into the print data stream can introduce a significant amount of overhead into the print data stream and thus, lead to inefficiencies.

Figure 5:
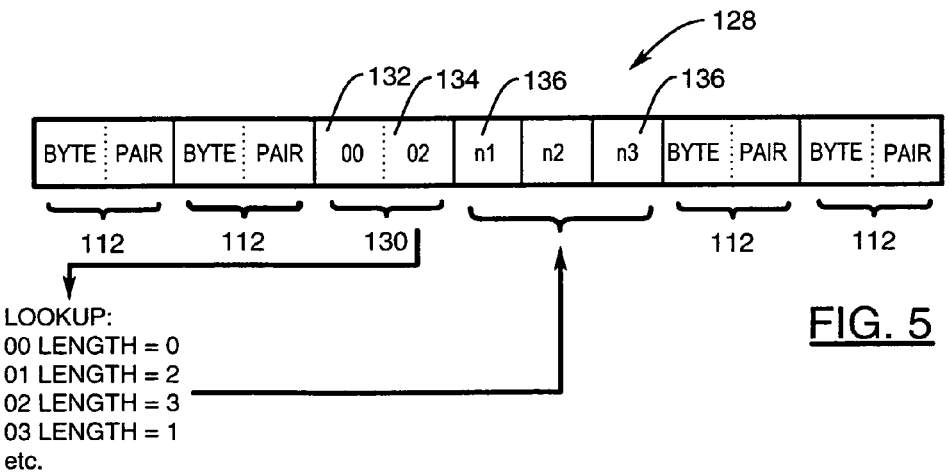
FIG. 5 shows a big-endian print data stream comprising a plurality of double-byte character codes and an embedded command code string including single-byte commands.

In an alternative embodiment, to avoid the above-described print data stream overhead inefficiency, rather than padding each command in a command code string with a null byte, in this embodiment the command code string 128 is padded with a command code string header 130 including a pair of data bytes 132 and 134 as shown in FIG. 5. The first data byte 132 of the command code string header 130 is a null data byte allowing the command code string header 130 to be detected by the microcontroller 60 in the manner described above. The second data byte 134 of the command code string header 130 identifies the number of 8-bit commands 136 in the command code string 128 that follow the command code string header 130. In this case, when the microcontroller 60 detects the null byte 132 of the command code string header 130, the microcontroller 60 compares the information in the second byte 134 of the command code string header 130 with a look-up table stored in the non-volatile memory 66 to determine the number of 8-bit commands that follow the command code string header. With the number of 8-bit commands determined, the print data stream following the command code string header 130 is parsed by the microcontroller 60 into single-bytes until the appropriate number of command codes have been extracted from the print data stream. At this point, the microcontroller 60 returns to parsing the print data stream into double-byte pairs until the next command code string header 130 is encountered.

Figure 6:
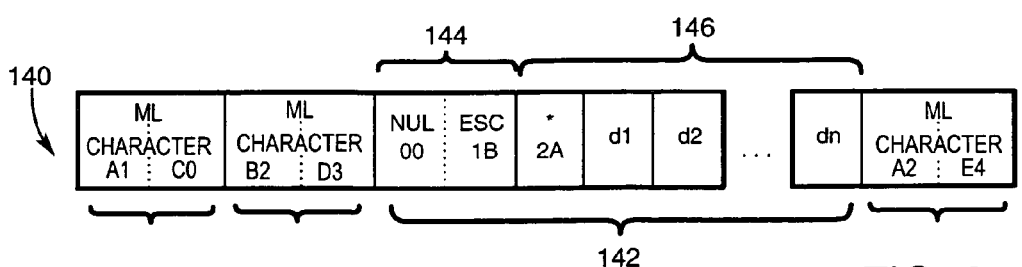
FIG. 6 shows a big-endian print data stream similar to that of FIG. 5 comprising a plurality of double-byte multilingual character codes and an embedded graphics command code sequence including single-byte commands.

The commands in the command code string may relate to printer operation and/or diagnostics or may comprise a command sequence to print non-standard characters or non-characters such as for example graphics images. FIG. 6 shows an example of a print data stream 140 including a command code string 142 comprising a command code string header 144 and a graphics image print command code sequence 146 embedded therein.

If desired, each command and command code string to be embedded into the print data stream can be padded with a command code string header including information identifying the number of command codes following the command code string header.

Although embodiments have been described, those of skill in the art will appreciate that the variations and modifications may be made without departing from the spirit and scope of the invention as defined by the appended claims.

What is claimed is:

1. A method of forming a print data stream including both character codes and command codes, said character codes having a bit length that is a multiple of the bit length of the command codes, said method comprising:

padding command codes to be embedded into a character code stream with an identifier sized to make the padded command codes generally of the same length as the character codes; and inserting the padded command codes into the character code stream thereby to form said print data stream, said identifier allowing embedded command codes to be detected and extracted from said print data stream while maintaining synchronization of the print data stream during character code extraction.

2. The method of claim 1 wherein each character code is double the size of a command code.

3. The method of claim 2 wherein each character code is represented by a data byte pair and each command code is represented by a single-byte, each command code being padded with a single-byte identifier.

4. The method of claim 3 wherein said identifier is a null data byte.

5. A printing method comprising:

in response to a print job, generating a character code stream including printable character codes, each of said character codes being of a first bit length;

padding command codes to be embedded into said character code stream with an identifier, said command codes and said identifier being of a second bit length that is one-half of the size of said first bit length;

inserting the padded command codes into the character code stream thereby to form a print data stream; and transmitting said print data stream to a printer, wherein said identifier allows said printer to detect and extract embedded command codes while maintaining synchronization thereby to enable character code extraction.

6. The method of claim 5 wherein each character code includes a data byte pair and each command code is a single-byte.

7. The method of claim 6 wherein said identifier is a null data byte.

8. The method of claim 7 wherein each command code is padded with a most significant null data byte.

9. The method of claim 7 wherein each command code is padded with a least significant null data byte.

10. The method of claim 5 wherein each character code is a multilingual character code defined by a data byte pair and wherein said identifier and said command codes are each defined by a single data byte.

11. The method of claim 10 wherein said identifier is a null data byte.

12. The method of claim 11 wherein each command code is padded with a most significant null data byte.

13. The method of claim 11 wherein each command code is padded with a least significant null data byte.

14. The method of claim 10 further comprising:

parsing the transmitted print data stream into data byte pairs;

examining each data byte pair to detect each data byte pair including an identifier; and for each data byte pair including an identifier, extracting and executing the command code.

15. The method of claim 14 wherein said identifier is a null data byte.

16. The method of claim 15 wherein each command code is padded with a most significant null data byte.

17. The method of claim 15 wherein each command code is padded with a least significant null data byte.

18. The method of claim 6 wherein said command codes form part of a command code string including a double-byte command code string header padding said command codes, said identifier forming part of said command code string header.

19. The method of claim 18 wherein said command code string header further comprises a data byte identifying the number of commands in said command code string.

20. The method of claim 19 wherein said identifier is a null data byte.

21. The method of claim 20 wherein said identifier is the most significant data byte of said command code string header.

22. The method of claim 20 wherein said identifier is the least significant data byte of said command code string header.

23. The method of claim 19 further comprising:

parsing the transmitted print data stream into data byte pairs; examining each data byte pair to detect each data byte pair including an identifier;

for each data byte pair including an identifier, examining the data byte of the command code string header to determine the number of single-byte commands in said command code string; and extracting each of said single-byte commands.

24. The method of claim 23 wherein said data byte is compared with information in a look-up table thereby to determine said number of single-byte commands.

25. The method of claim 24 wherein said identifier IS a null data byte.

26. An apparatus for generating a print data stream comprising:

a character code stream generator generating a character code stream in response to a print job, said character code stream including printable character codes, each of said character codes being of a first bit length;

a command code padder padding command codes to be embedded into said character code stream with an identifier, said command codes and said identifier being of a second bit length that is one-half of the size of said first bit length, said command code padder inserting the padded command codes into the character code stream thereby to form said print data stream; and a transmitter transmitting said print data stream to a printer, wherein said identifier allows said printer to detect and extract embedded command codes while maintaining synchronization thereby to enable character code extraction.

27. An apparatus according to claim 26 wherein each character code includes a data byte pair and each command code is a single-byte.

28. An apparatus according to claim 27 wherein said identifier is a null data byte.

29. An apparatus according to claim 28 wherein said command code padder pads each command code with a most significant null data byte.

30. An apparatus according to claim 28 wherein said command code padder pads each command code with a least significant null data byte.

31. An apparatus according to claim 26 wherein each character code is a multilingual character code defined by a data byte pair and wherein each identifier and command code is defined by a single data byte.

32. An apparatus according to claim 31 wherein said identifier is a null data byte.

33. An apparatus according to claim 32 wherein said command code padder pads each command code with a most significant null data byte.

34. An apparatus according to claim 32 wherein said command code padder pads each command code with a least significant null data byte.

35. A printing system comprising:

a printing device responsive to print jobs to print information on media; and a host device generating print jobs for transmission to said printing device, said host device transmitting each print job to said printing device as a print data stream including both character codes and command codes, said character codes having a bit length that is a multiple of the bit length of the command codes, said host device padding command codes to be embedded into a character code stream with an identifier sized to make the padded command codes generally of the same length as the character codes and inserting the padded command codes into the character code stream thereby to form said print data stream, said identifier allowing embedded command codes to be detected and extracted from said print data stream by said printing device while maintaining synchronization of the print data stream during character code extraction.

36. A printing system according to claim 35 wherein each character code is double the size of a command code.

37. A printing system according to claim 36 wherein each character code is represented by a data byte pair and each command code is represented by a single-byte, each command code being padded with a single-byte identifier.

38. A printing system according to claim 37 wherein said identifier is a null data byte.

39. A printer responsive to a print data stream including both character codes and command codes, said printer comprising:

a parser parsing said print data stream into data byte pairs;

a controller examining each data byte pair to detect each data byte pair including an identifier, said controller, for each data byte pair including an identifier, extracting and executing an associated command code; and a printer mechanism in communication with said controller and printing information on a print medium in response to said character codes.

40. A printer according to claim 39 wherein said identifier is a null data byte.

41. A printer according to claim 40 wherein said parser and controller are constituted by a microcontroller.

* * * * *